June 30, 1942.   N. J. STEMME   2,288,044
GLASS
Filed March 13, 1940
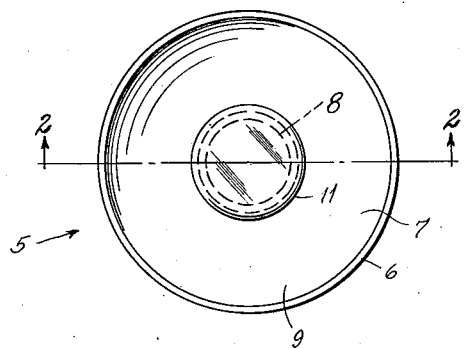
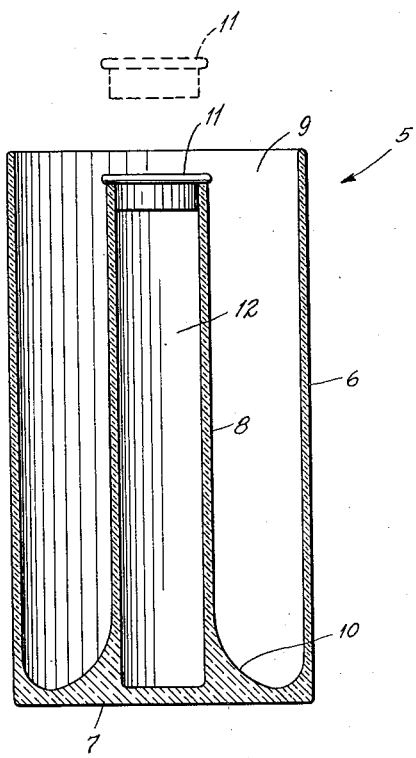
INVENTOR:
NORMAN J. STEMME,
BY Lawrence C. Kingsland
ATTORNEY.

Patented June 30, 1942

2,288,044

UNITED STATES PATENT OFFICE 2,288,044

GLASS

Norman J. Stemme, St. Louis, Mo.

Application March 13, 1940, Serial No. 323,721

1 Claim. (Cl. 62—147)

The present invention relates generally to drinking receptacles, and more particularly to a glass which includes separate compartments for the liquid and a cooling means for the liquid.

Therefore, an object of the present invention is to provide a novel drinking receptacle in which there is provided means for maintaining a cooling means separate from the liquid being consumed, the liquid being cooled for consumption.

Another object is to provide a novel drinking receptacle which includes two chambers, one for the fluid to be consumed, and the other for a cooling means for the liquid.

Another object is to provide a novel drinking glass which is constructed to provide a space for the liquid to be contained for consumption and another space for a cooling means for the liquid.

Another object is to provide a novel drinking glass in which a liquid may be cooled without mixing the cooling means and the liquid to be contained and consumed.

Another object is to provide a novel drinking glass which is simple in construction in containing separate chambers of integral construction.

Other objects and advantages will be apparent from the following description, taken in conjunction with the accompanying drawing, in which:

Fig. 1 is a top plan view of a drinking receptacle constructed in accordance with the teachings of the present invention; and, Fig. 2 is a section on the line 2—2 of Fig. 1.

Referring to the drawing more particularly by reference numerals, 5 indicates generally a drinking receptacle in the form of a glass constructed in accordance with the concepts of the present invention. The glass 5 includes a circular wall 6 and a bottom 7. Within the glass 5 is a hollow tube 8 preferably of the same material as the remaining portions of the glass 5 and integral with the bottom 7, as is apparent from Fig. 2. The interior of the circular wall 6 and the exterior of the tube 8 form a circular chamber 9 in which liquid to be consumed is disposed. The bottom of the annular chamber 9 is rounded, as at 10, for the three-fold purpose of producing an ornamental effect, of producing a construction easy to clean, and of providing a strong construction. The interior surface of the tube 8, together with the defined portion of the interior face of the bottom 7, provides a chamber 12 for the reception of a cooling means such as crushed or finely cracked ice. A cap or plug 11 of the configuration shown engages the free end of the tube 8. The cap 11 may be of any preferred material.

In use, crushed or finely cracked ice is placed in the tube 8, after which the cap 11 is disposed in the position shown in Fig. 2. The liquid to be cooled by the cooling medium within the tube 8 may then be poured in the glass without fear of pouring a portion of it into the tube 8, since the overhanging cap 11 prevents such a result. The cooling medium is thus maintained in the chamber 12 separate and apart from the liquid within the chamber 9.

Where ice is employed as the cooling medium, the separation of it from the liquid in the chamber 9 in the manner described prevents dilution of the drink. This prevention of dilution enables the accurate mixing of a drink which may comprise several ingredients and maintains the accuracy so effected to the last drop. Furthermore, the ice is maintained out of contact with the teeth of an individual employing the receptacle 5, thus avoiding the inevitable chilling of the teeth which such contact causes.

It is apparent that there has been provided a drinking receptacle which is practical as a device for obviating the several shortcomings of the present conventional drinking receptacles, and which manifestly fulfills all of the objects and advantages sought therefor.

It is to be understood that the foregoing description and accompanying drawing have been given by way of illustration and example and not for purposes of limitation, the invention being limited by the claim which follows.

What is claimed is:

A drinking receptacle comprising a continuous exterior wall, a continuous bottom, and an interiorly disposed continuous wall connected to the bottom and extending upwardly therefrom, said bottom portion having a curved inside surface blending into the inner side of the exterior wall and into the outer side of the interior wall, said interiorly disposed wall being of a predetermined less height than the exterior wall, the inner side of the exterior wall and the outer side of the interior wall and a portion of the bottom defining a first chamber, the interior side of the interior wall and another portion of the bottom defining a second chamber of such height and of such restricted diameter as to tend to restrict the spilling of the contents of the second chamber during the normal use of the receptacle, and means for substantially sealing the opening of the interiorly disposed continuous wall.

NORMAN J. STEMME.

Patent No. 2,288,044 Granted June 30, 1942
NORMAN J. STEMME

The above entitled patent was extended August 28, 1951, under the provisions of the act of June 30, 1950, for 7 years and 79 days from the expiration of the original term thereof.

*Commissioner of Patents.*